United States Patent [19]

Nelson

[11] Patent Number: 4,517,931
[45] Date of Patent: May 21, 1985

[54] VARIABLE STROKE ENGINE

[76] Inventor: Carl D. Nelson, Rte. 1, Ennis, Tex. 75119

[21] Appl. No.: 510,288

[22] Filed: Jun. 30, 1983

[51] Int. Cl.³ .......................................... F02B 75/04
[52] U.S. Cl. ............................. 123/48 B; 123/78 F; 123/197 AC
[58] Field of Search ................ 123/78 R, 78 F, 78 E, 123/48 R, 48 B, 316, 197 AB, 197 AC, 54 R, 54 D

[56] References Cited

U.S. PATENT DOCUMENTS

| Re. 30,565 | 4/1981 | Kristiansen | 123/43 |
|---|---|---|---|
| 367,496 | 10/1887 | Atkinson | 123/197 AC |
| 1,112,832 | 10/1914 | Pierce | 123/78 F |
| 1,174,801 | 3/1916 | Babcock | 123/78 |
| 1,786,423 | 5/1928 | Cady | 123/78 F |
| 1,874,194 | 8/1932 | King | 123/78 E |
| 1,901,263 | 3/1933 | Ruud | 123/78 |
| 1,912,604 | 6/1933 | Valentine | 123/48 B |
| 2,277,130 | 5/1942 | Miller | 123/48 |
| 2,315,114 | 3/1943 | Fels | 123/197 AC |
| 2,909,164 | 10/1959 | Biermann | 123/48 |
| 4,022,167 | 5/1977 | Kristiansen | 123/43 |
| 4,112,826 | 9/1978 | Cataldo | 123/78 F |
| 4,131,094 | 12/1978 | Crise | 123/78 E |
| 4,157,079 | 6/1979 | Kristiansen | 123/43 |
| 4,173,202 | 11/1979 | Crise | 123/78 |
| 4,270,495 | 6/1981 | Freudenstein et al. | 123/197 AC |

FOREIGN PATENT DOCUMENTS

| 521700 | 8/1953 | Belgium | 123/78 |
|---|---|---|---|
| 507783 | 7/1920 | France | 123/78 F |
| 513039 | 10/1920 | France | 123/78 |
| 903016 | 9/1945 | France | 123/78 |

OTHER PUBLICATIONS

Article from Farm Industry News, dated Apr. 1979, entitled "K-Cycle Engine: Canada's Answer to the Fuel Crisis?".

Primary Examiner—Ira S. Lazarus
Assistant Examiner—R. S. Bailey
Attorney, Agent, or Firm—Richards, Harris, Medlock & Andrews

[57] ABSTRACT

An improved variable stroke internal combustion engine (10) is disclosed. The power stroke and exhaust stroke of the engine are relatively longer than the intake stroke and compression stroke for increased power output from the engine (10). A connecting rod (40) is pivotally connected to the piston (16) and a trunnion assembly (28). The trunnion assembly is rotatably mounted to a journal (24) on the crankshaft (20). A control shaft (46) is rotatably mounted within the engine and connected to the crankshaft (20) so that the control shaft rotates at one-half the angular velocity of the crankshaft. A control link (52) is rotatably mounted on a journal (50) of the control shaft (46) with its opposite end being pivotally connected to the trunnion assembly (28).

14 Claims, 13 Drawing Figures

VARIABLE STROKE ENGINE

TECHNICAL FIELD

This invention relates to internal combustion engine design and specifically to a design for varying the stroke of the piston within the engine.

BACKGROUND ART

The internal combustion engine has been a mainstay in automotive, rail, shipping and other applications. In automotive applications, the engine generally takes the form of a four cycle gasoline engine using the Otto cycle with the four cycles including intake, compression, power and exhaust. In truck and larger applications, the engine is typically a four cycle Diesel engine.

Since the initial design of the four cycle internal combustion engine, there has been an ongoing effort to improve the performance characteristics of the engine. Performance can be measured in a number of ways, including power output per engine weight or combustion chamber volume, an ability to operate on lower octane fuels, the ability to operate with greater fuel efficiency and the desire to reduce the number of moving parts within the engine, thereby increasing reliability. In recent years, emphasis has also been given in the area of emissions.

In conventional internal combustion engines, the length of stroke of the piston for each cycle is constant. This design requires the volume swept by the piston in the cylinder to be equal for each stroke of the engine cycle. Ideally, the stroke length of the piston during the power stroke should be increased relative to the other cycles to maximize the work and energy output of the engine.

In the past, several attempts have been made to design a variable stroke engine. An early example is U.S. Pat. No. 1,174,801 issued to George E. Babcock on Mar. 7, 1916. In this patent, the power stroke is not maximized. The exhaust stroke is actually longer than the power stroke. The top dead center position of the piston also varies during the four cycles. In addition, the cam shaft identified by reference numeral 6 in the patent would be required to transmit all force from the piston to the crankshaft 14, requiring the cam shaft 6 to be of equal strength to crankshaft 14. U.S. Pat. No. 1,786,423 to Cady issued Dec. 30, 1930 also discloses a variable stroke internal combustion engine. In this patent the intake stroke is the longest stroke and the power or firing stroke is the shortest stroke. Again, this patent discloses an indirect connection between the piston and crankshaft.

More recently, an internal combustion engine of a rotary type has been developed and disclosed in U.S. Pat. No. 4,157,079 issued to Kristiansen on June 5, 1979 and U.S. Pat. No. Re. 30,565 issued to Kristiansen on Apr. 7, 1981. These patents disclose a rotary engine which maximizes the stroke length of the power stroke for increased power output. The rotary engine has multiple pistons and a single cylinder with the stroke of the pistons determined by an annular cam. In U.S. Pat. No. Re. 30,565, at column 2, lines 57-59, the patent suggests a cam-type crankshaft can be utilized with a conventional opposing piston engine so that the expansion stroke is longer than the compression stroke.

However, these prior art devices have not proven totally effective. A need therefore exists for an internal combustion engine design which takes advantage of an elongated combustion stroke for increased engine output with an efficient and reliable operation.

SUMMARY OF THE INVENTION

In accordance with one aspect of the present invention, a four cycle internal combustion engine is provided. The engine includes structure defining a cylinder and a piston for reciprocation within the cylinder. Means are provided for entering a combustible mixture within the cylinder and combusting the mixture to urge the piston in a first direction and further includes means for removing the mixture after combustion. The engine includes a crankshaft mounted for rotation about a first axis and a trunnion mounted for pivotal motion on the crankshaft with the axis of pivotal motion of the trunnion being parallel to and spaced from the first axis of rotation of the crankshaft. A connecting rod is pivotally connected to the piston at a first end thereof and pivotally connected to the trunnion at a second end thereof. A control shaft is mounted for rotation about a second axis. A control link is rotatably connected to the control shaft at a first end of the control link for rotation about an axis parallel to and spaced from the second axis. The control link is pivotally connected at a second end thereof to the trunnion. Means are provided for connecting the crankshaft and control shaft for joint rotation with the control shaft rotating at one half the angular velocity of the crankshaft. This engine provides a power and exhaust stroke of equal length and an intake and compression stroke of equal length with the power and exhaust strokes being longer than the intake and compression strokes.

In accordance with another aspect of the present invention, the top dead center position of the piston relative to the cylinder remains constant throughout the cycle of the engine.

In accordance with another aspect of the present invention, the trunnion is pivotally connected to an eccentric journal on the crankshaft and the first end of the control link is rotatably connected to an eccentric journal on the control shaft.

In accordance with another aspect of the present invention, the control shaft is formed by the cam shaft of the engine.

BRIEF DESCRIPTION OF THE DRAWINGS

A more complete understanding of the invention may be had by reference to the following Detailed Description when taken in conjunction with the accompanying Drawings wherein.

DETAILED DESCRIPTION

Figure 1:
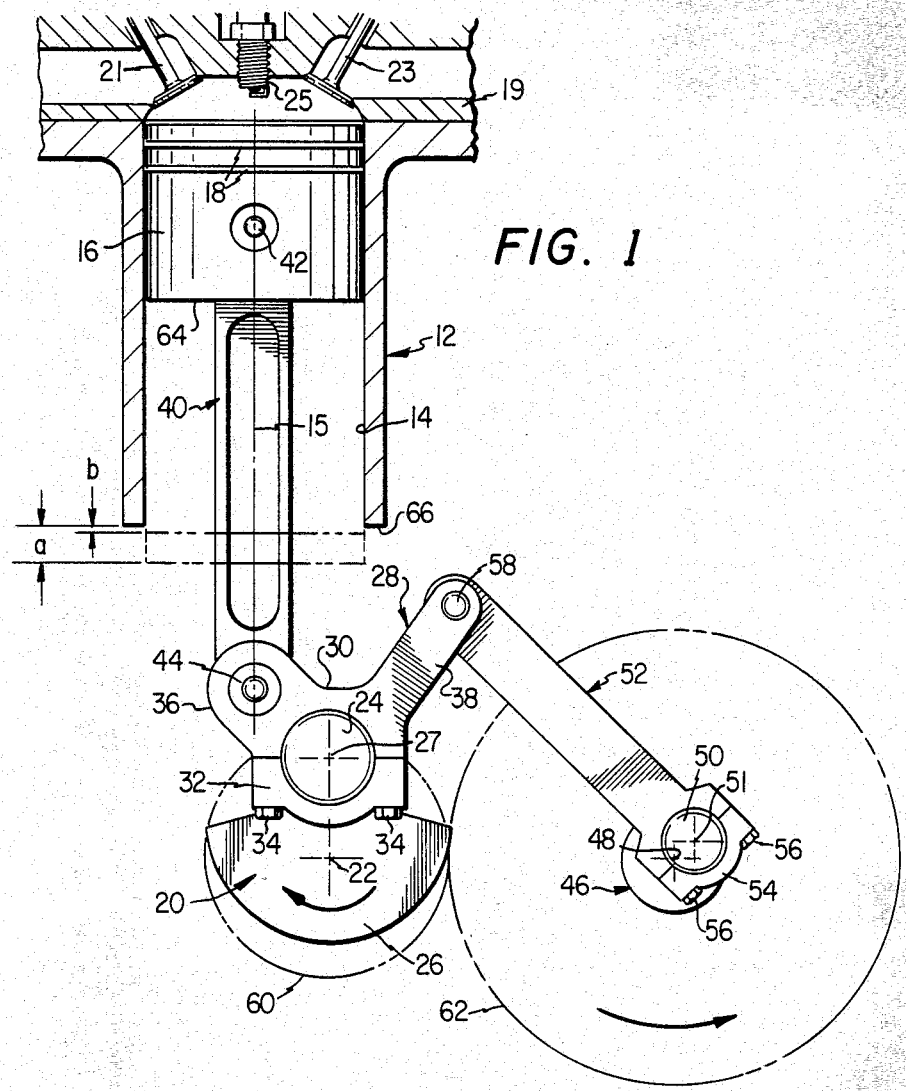
FIG. 1 is a schematic illustration of an engine design forming a first embodiment of the present invention illustrating the piston in the top dead center position for ignition with 0° crankshaft and control shaft rotation.

Referring now to the Drawings, wherein like reference characters designate like or corresponding parts throughout several views, and particular to FIG. 1, an internal combustion engine 10 is disclosed in which the power and exhaust strokes are longer than the intake and compression strokes. Engine 10 can be a conventional Otto cycle engine for use with gasoline, a Diesel cycle engine for use with Diesel fuel or any other internal combustion cycle desired. While the internal combustion engine 10 is described as a four cycle engine, having four separate cycles of power, exhaust, intake and compression, the principle of the engine can equally well be applied to a two cycle engine although the device would not have variable displacement during a given two cycle operation.

FIG. 1 illustrates a piston cylinder 12 which forms a portion of the engine block or main structure of the engine. The piston cylinder 12 defines a cylindrical piston wall 14 and a central axis 15. A piston 16 is slidably positioned within the piston cylinder 12. The piston 16 has rings 18 of a conventional type to provide sealing between the piston wall 14 and the piston 16. An engine head 19 is mounted on the upper portion of the piston cylinder 12 to close one end of the cylinder. The head conventionally includes intake and exhaust valves 21 and 23 connected to a carburation system and exhaust system for entering a combustion mixture into the cylinder and exhausting the mixture after combustion through the exhaust system. A spark plug 25 can be provided for igniting the mixture in a gasoline engine. In a Diesel engine, combustion occurs through the temperature elevation of the mixture upon compression. Since all of these components are well-known in the art, they are not described further herein.

A crankshaft 20 is rotatably mounted within the engine 10 for rotation about a first axis 22 which is offset from axis 15 and perpendicular thereto. The crankshaft 20 can be mounted with conventional shell type bearings in the engine block. The crankshaft includes an eccentric journal 24 centered on axis 27 offset from the first axis and a counter balance weight 26 to balance the crankshaft during rotation.

A trunnion assembly 28 is pivotally mounted to the crankshaft 20 at the eccentric journal 24. The trunnion assembly includes an upper portion 30 and a lower portion 32 which are held together by bolts 34. Bearing material can be positioned between the portions 30 and 32 and the eccentric journal 24 to maintain pivotal motion even during transfer of significant loads from the piston 16 to the crankshaft 20. The upper portion 30 of the trunnion assembly 28 has a first extension 36 and a second extension 38. A connecting rod 40 is pivotally connected to the piston 16 at a first end thereof by a piston wrist pin 42 and is pivotally connected to the first extension 36 at a second end by a connecting rod to trunnion wrist pin 44.

A control shaft 46 is similarly mounted for rotation about a second axis 48 which is spaced from the first axis 22 but parallel therewith. The control shaft 46 can, for example, comprise the cam shaft of the engine 10 which operates to operate the intake and exhaust valves 21 and 23 in the valve train. The control shaft 46 has an eccentric journal 50 centered on axis 51 which is offset from the second axis 48. A control link 52 is rotatably secured to the eccentric journal 50 at a first end thereof. The control link 52 includes a bearing cap 54 secured to the remainder of the control link 52 by bolts 56. Bearing structure can be provided between the bearing cap 54 and control link 52 and the eccentric journal 50 for transference of loads between the control link 52 and control shaft 46 while permitting rotation between the link 52 and shaft 46. The opposite end of the control link 52 is pivotally secured to the second extension 38 of the trunnion assembly 28 by a trunnion to control link wrist pin 58.

The crankshaft 20 and the control shaft 46 are joined for mutual rotation by intermeshing gears 60 and 62. In a four cycle engine, the gear ratios of gears 60 and 62 are preferably designed so that the control shaft 46 will rotate with one-half the angular velocity of the crankshaft 20. This permits the control shaft 46 to also act as a cam shaft since the cam shaft in the typical four cycle engine will also rotate at one-half the angular velocity of the crankshaft.

As is clearly apparent from FIG. 1, the movement of piston 16 is determined by the interrelationship of the crankshaft 20, control shaft 46, connecting rod 40, trunnion assembly 28 and control link 52. As will be understood from the following description, the engine 10 will provide a relatively elongated power and exhaust stroke where the bottom edge 64 of the piston 16 will extend a distance a from the bottom edge 66 of the piston cylinder 12 at the bottom dead center position between the power and exhaust strokes. The engine will only permit the bottom edge 64 of the piston 16 to extend a lesser distance b below the bottom edge 66 of the piston cylinder 12 at the bottom dead center position between the intake and compression strokes. Top dead center for piston 16 between the compression and power strokes and between the exhaust and intake strokes is in the identical position in cylinder 12. While only a single piston 16 and cylinder 12 are shown, it is readily understood that multiple pistons 16 and cylinders 12 can be operated from a common crankshaft 20 and control shaft 46.

Figure 2:
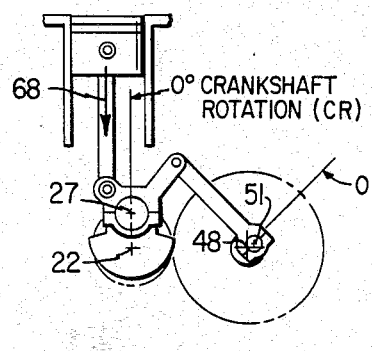
FIG. 2 is a schematic illustration of the engine again showing the piston in the top dead center ignition position.

With reference now to FIGS. 2–11, one complete cycle of the engine 10 will be described with the angular positions of the crankshaft 20 and control shaft 46 being arbitrarily set at 0° when the piston 16 is at the top dead center position between the compression and power strokes as seen in FIG. 2. FIG. 2 illustrates the engine 10 in the identical portion of the cycle as FIG. 1. As is apparent from FIG. 2, the connecting rod 40 is aligned with the direction of motion 68 of the piston 16 within the cylinder 12 during the power stroke. This provides for the most efficient transference of the motion of the piston to the crankshaft.

Figure 3:
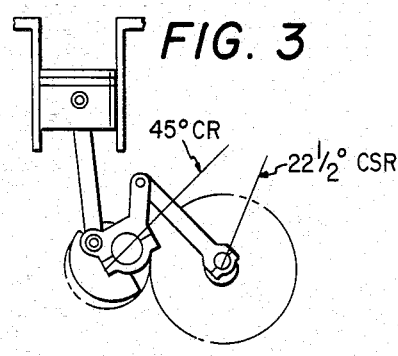
FIG. 3 is a schematic illustration of the engine showing a portion of the power stroke with the crankshaft rotated 45°.

Upon ignition, the piston 16 will move downwardly within the piston cylinder 12 in direction 68 during the power stroke. As seen in FIG. 3, the piston 16 has moved downwardly sufficient to rotate the crankshaft 45° with the control shaft rotating an angle of 22½°.

Figure 4:
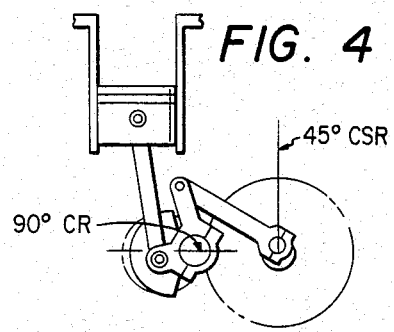
FIG. 4 is a schematic illustration of the engine during the power stroke with the crankshaft at 90° rotation.

FIG. 4 illustrates a continuation of the power stroke with the crankshaft having rotated a 90° angle from the top dead center position at the beginning of the power stroke and the control shaft 46 having rotated an angle of 45°.

Figure 5:
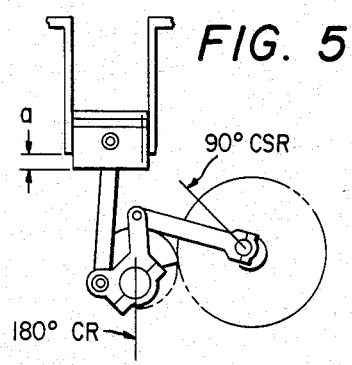
FIG. 5 is a schematic illustration of the engine during the power stroke with the piston reaching bottom dead center and the crankshaft rotated 180°.

FIG. 5 illustrates the piston 16 at the bottom dead center position at the end of the power stroke with the crankshaft 20 having rotated an angle of 180° and the control shaft 46 having rotation of 90°.

Figure 6:
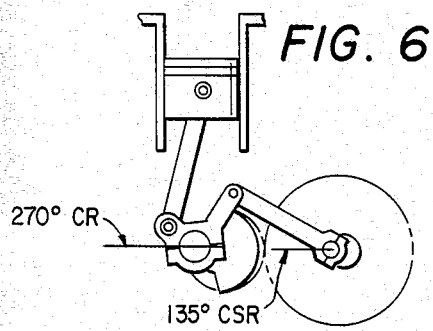
FIG. 6 is a schematic illustration of the engine midway during the exhaust stroke with crankshaft rotation of 270°.

FIG. 6 illustrates the piston 16 during the exhaust stroke with crankshaft rotation of 270° and control shaft 46 rotation of 135°.

Figure 7:
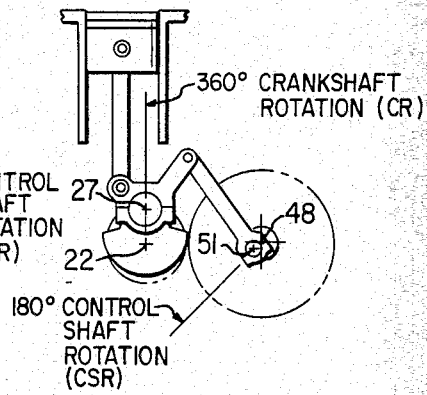
FIG. 7 is a schematic illustration of the engine at the end of the exhaust stroke and the beginning of the intake stroke at top dead center with crankshaft rotation of 360°.

FIG. 7 illustrates the piston 16 at the top dead center position between the exhaust and intake strokes with crankshaft rotation of 360° and control shaft rotation of 180°. It will be observed that the top dead center position of piston 16 relative to the piston cylinder 12 is identical between the exhaust and intake strokes and the compression and power strokes.

Figure 8:
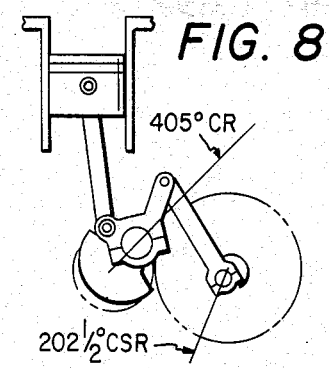
FIG. 8 is a schematic illustration of the engine during the intake stroke with crankshaft rotation of 405°.

FIG. 8 illustrates the piston 16 during the intake stroke with crankshaft rotation of 405° and a control shaft rotation of 202.5°.

Figure 9:
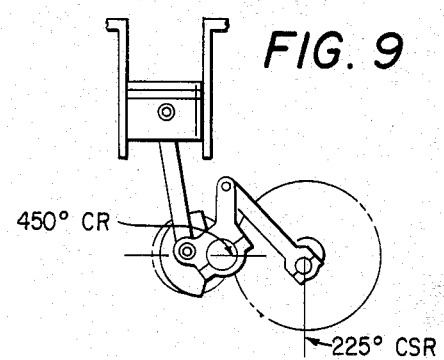
FIG. 9 is a schematic illustration of the engine during the intake stroke with crankshaft rotation of 450°.

FIG. 9 illustrates the piston 16 during another portion of the intake stroke with crankshaft 20 rotation of 450° and control shaft 46 rotation of 225°.

Figure 10:
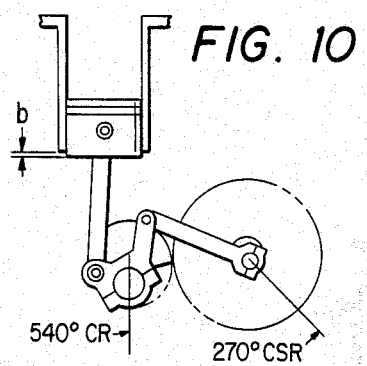
FIG. 10 is a schematic illustration of the engine at bottom dead center at the end of the intake stroke with crankshaft rotation of 540°.

FIG. 10 illustrates the piston 16 in the bottom dead center position between the intake and compression stroke. As will be apparent from a comparison of FIGS. 5 and 10, the bottom dead center position of the piston 16 in FIG. 10 permits the bottom edge 64 of the piston 16 to extend only a distance b from the bottom edge 66 of the piston cylinder 12. Of course, it is not necessary for any part of piston 16 to actually extend from piston cylinder 12. The important feature is the elongated power and exhaust strokes. Crankshaft 20 has a rotation of 540° while the control shaft 46 has a rotation of 270°.

Figure 11:
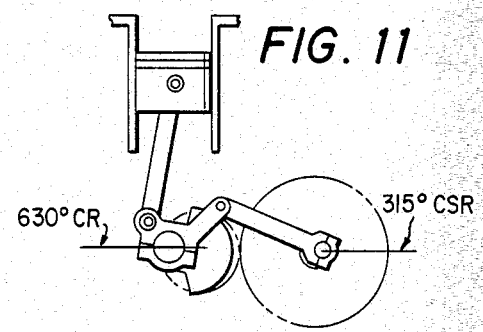
FIG. 11 is a schematic illustration of the engine in the compression stroke with a crankshaft rotation of 630°.

FIG. 11 illustrates the piston 16 during the compression stroke with the crankshaft 20 having rotation of 630° and the control shaft 46 having rotation of 315°. As the piston 16 achieves top dead center between the compression and power strokes, the crankshaft has completed a total rotation of 720° and the control shaft 46 a rotation of 360° for the beginning of a new cycle.

The internal combustion engine 10 accomplishes the desired result of a relatively elongated power stroke by the use of relatively few components, reducing cost and increasing durability. The exhaust stroke is of equal length to the power stroke to provide efficient exhaust of the combusted mixture. The intake and compression strokes are minimized. The engine transmits the majority of the power generated during the power stroke directly to the engine crankshaft 20 with some power being transmitted to the control shaft 46. This avoids the necessity of having two or more rotating shafts, each of which has to be constructed with sufficient strength to absorb the entire energy generated by the engine. The use of a variable stroke design permits higher power output for a given engine displacement with correspondingly lower emission levels and noise levels. In addition, the acceleration rate of the piston 16 during the power stroke is believed to be more compatible with the burning rate of conventional combustion mixtures. The engine 10 is expected to operate on lower octane fuel than an equivalent horsepower conventional engine and to be more fuel efficient.

Figure 12A:
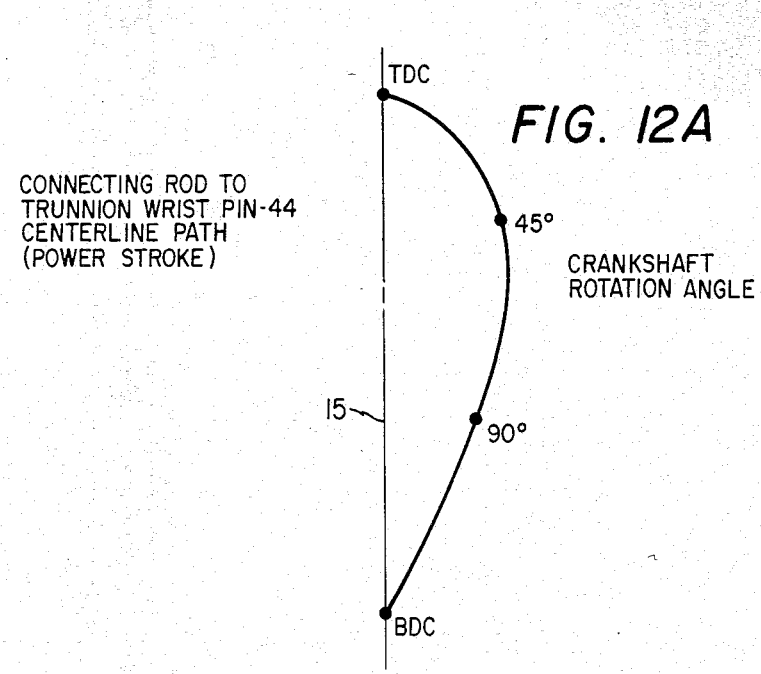
FIGS. 12A and 12B are graphic representations of the path of the connecting rod to trunnion pin and crankshaft journal path, respectively, during the power stroke.
Figure 12B:
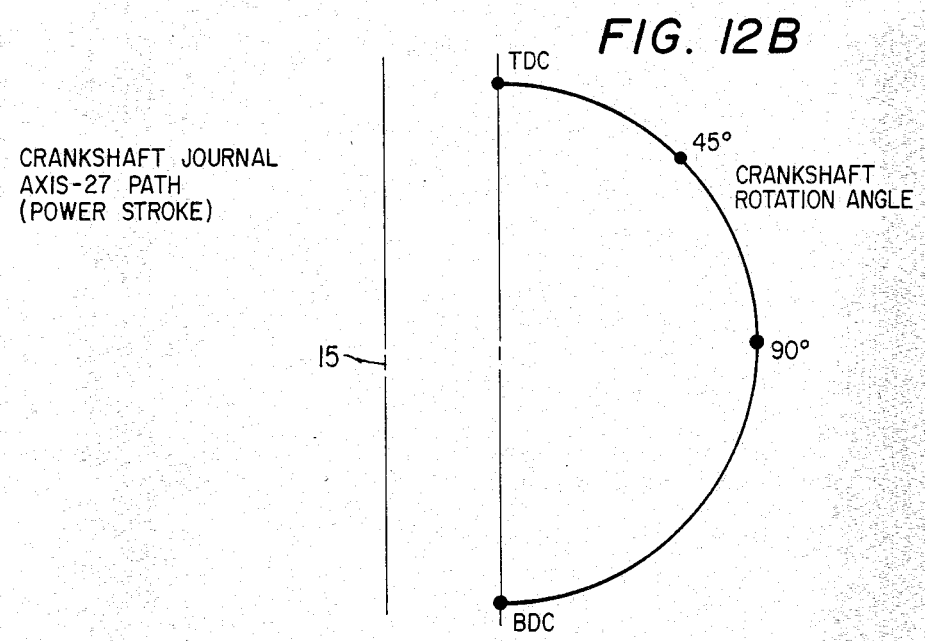

The use of the trunnion assembly 28 permits the connecting rod 40 to have a lower connecting rod to piston angle of incidence, i.e., to remain more parallel to the central axis 15 of motion of the piston 16 during rotation of the crankshaft 20 than would be possible if the connecting rod 40 was connected directly to the eccentric journal 24 of the crankshaft 20. When the connecting rod is parallel the direction of motion of the piston 16, energy transference is most effective between the piston and the crankshaft. Since the design of engine 10 permits the connecting rod to remain closer in alignment with the direction of motion of the piston, energy transference from the piston 16 is more efficient than would be encountered in a conventional engine. This advantage is illustrated in FIGS. 12A and 12B which indicates that the path of pin 44 on trunnion assembly 28 remains closer to a line between its top dead center position and bottom dead center position than axis 27 of crankshaft 20.

The use of the trunnion assembly 28 further provides a torque amplification between the connecting rod 40 and the crankshaft 20. In a conventional engine, connecting rod 40 would be directly connected to journal 24. The effective torque arm in the conventional engine would be between the axis 27 of the journal 24 to the first axis 22 of the crankshaft 20. In the present invention, the torque arm is defined between the center of the connecting rod to trunnion wrist pin 44, through the center of the journal 24 and to the first axis 22. For example, as illustrated in FIG. 4, the effective linkage is the combined distance between the center of pin 44 and journal 24 and the distance between journal 24 and the first axis 22. The connecting rod 40, trunnion assembly 28 and journal 24 thereby form a torque multiplying linkage between piston 16 and crankshaft 20.

Although one embodiment of the invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

I claim:

1. An internal combustion engine comprising:
   structure defining a cylinder;
   a piston for reciprocation in said cylinder;
   means for entering a combustible mixture within the cylinder and combusting said mixture to urge said piston in a first direction;
   means for removing the mixture after combustion;
   a first shaft mounted for rotation about a first axis;
   a trunnion mounted for pivotal motion on said first shaft, the axis of pivotal motion of said trunnion being parallel to and spaced from the first axis of rotation of the first shaft;
   a connecting rod pivotally connected to the piston at a first end thereof and pivotally connected to the trunnion at a second end thereof, the piston therefore being connected directly to the first shaft through the connecting rod and the trunnion;
   a second shaft mounted for rotation about a second axis;

a control link rotatably connected to said second shaft at a first end of the control link for rotation about an axis parallel to and spaced from the second axis, said control link being pivotally connected at a second end thereof to the trunnion;

means for connecting the first shaft and second shaft for joint rotation with a predetermined ratio of angular velocity; and the intake stroke of said engine being shorter than the power stroke of the engine to increase the power output of the engine.

2. The engine of claim 1 wherein said first shaft is a crankshaft and said second shaft is a control shaft, the majority of energy being transferred directly from the piston during the power stroke to the crankshaft.

3. The engine of claim 1 being a four cycle engine with the top dead center position of the piston being identical between the compression and power strokes and the exhaust and intake strokes, the bottom dead center position between the power stroke and exhaust stroke being relatively more distant from the top dead center position than the bottom dead center position between the intake and compression strokes.

4. The engine of claim 1 wherein said means for connecting the first and second shafts for joint rotation rotates the second shaft at one-half the angular velocity of the first shaft.

5. The engine of claim 1 wherein said trunnion is pivotally mounted to a journal having an axis parallel to but spaced from the first axis and said first end of the control link being rotatably connected to a journal on the second shaft having an axis parallel to but spaced from the second axis, the trunnion creating a torque multiplying linkage between the connecting rod and first shaft.

6. The engine of claim 1 wherein said second shaft is formed by the cam shaft of the engine.

7. A four cycle internal combustion engine comprising:

structure defining a cylinder;

a piston for reciprocation in said cylinder;

means for entering a combustible mixture within the cylinder during the intake stroke and combusting said mixture to urge said piston in a first direction during the power stroke;

means for removing the mixture after combustion during the exhaust stroke;

a crankshaft mounted for rotation about a first axis;

a trunnion mounted for pivotal motion on crankshaft, the axis of pivotal motion being parallel to and spaced from the first axis of rotation of the crankshaft;

a connecting rod pivotally connected to the piston at a first end thereof and pivotally connected to the trunnion at a second end thereof, the piston therefore being connected directly to the crankshaft through the connecting rod and the trunnion;

a control shaft mounted for rotation about a second axis;

a control link rotatably connected to said control shaft at a first end of the control link for rotation about an axis parallel to and spaced from the second axis, said control link being pivotally connected at a second end thereof to the trunnion;

means for connecting the crankshaft and control shaft for joint rotation with the control shaft rotating at one-half the angular velocity of the crankshaft; and the engine causing the piston to be positioned at the identical location in the cylinder at the top dead center position between the compression and power strokes and the exhaust and intake strokes with the bottom dead center position of the piston between the power and exhaust strokes being relatively more distant from the top dead center position than the bottom dead center position of the piston between the intake and compression strokes so that the power stroke is longer than the intake stroke to increase power output from the engine.

8. The engine of claim 7 wherein the majority of energy is transferred directly to the crankshaft during the power stroke.

9. The engine of claim 7 wherein said trunnion is connected to a journal of the crankshaft and said first end of the control link is connected to a journal of the control shaft, the connecting rod, trunnion and journal defining a torque multiplying linkage between the piston and crankshaft.

10. The engine of claim 7 wherein said control shaft is a cam shaft controlling the valve operation of the engine.

11. A four cycle internal combustion engine comprising:

structure defining a cylinder;

a piston for reciprocation in said cylinder;

means for entering a combustible mixture within the cylinder during the intake stroke;

means for combusting said mixture within the cylinder to urge said piston in a first direction within the cylinder during the power stroke;

means for removing the mixture after combustion during the exhaust stroke of the engine;

a crankshaft mounted for rotation about a first axis, said first axis being spaced from the central axis of the cylinder and perpendicular thereto, said crankshaft having a journal spaced from the first axis;

a trunnion mounted for pivotal motion on said journal of said crankshaft, the axis of pivotal motion being parallel to and spaced from the first axis of rotation of the crankshaft;

a connecting rod pivotally connected to the piston at a first end thereof and pivotally connected to the trunnion at a second end thereof, the piston therefore being connected directly to the crankshaft through the connecting rod and trunnion;

a control shaft mounted for rotation about a second axis spaced from and parallel to the first axis, said control shaft having a journal spaced from the second axis;

a control link rotatably connected to said control shaft at the journal at a first end of the control link for rotation about an axis parallel to and spaced from the second axis, said control link being pivotally connected at a second end thereof to the trunnion;

means for connecting the crankshaft and control shaft for joint rotation with the control shaft rotating at one-half the angular velocity of the crankshaft; and the power and exhaust strokes of the piston being longer than the intake and compression strokes to increase the energy output of the engine.

12. The engine of claim 11 wherein the top dead center position of the piston within the cylinder is identical between the compression and power strokes and the exhaust and inlet strokes.

13. The engine of claim 11 wherein the majority of energy is transferred from the piston directly to the crankshaft through the connecting rod and trunnion.

14. The engine of claim 11 wherein said connecting rod, trunnion and journal defined a torque multiplying linkage between the piston and crankshaft with reduced connecting rod to piston angle of incidence relative to a conventional engine.

* * * * *

UNITED STATES PATENT AND TRADEMARK OFFICE
CERTIFICATE OF CORRECTION

PATENT NO. : 4,517,931
DATED : May 21, 1985
INVENTOR(S) : Carl D. Nelson

It is certified that error appears in the above-identified patent and that said Letters Patent is hereby corrected as shown below:

Column 7, line 49, after "on" insert --said--.

Signed and Sealed this

Fifteenth Day of October 1985

[SEAL]

*Attest:*

*Attesting Officer*

DONALD J. QUIGG

*Commissioner of Patents and Trademarks—Designate*